March 3, 1959  M. SKUMAWITZ  2,875,665
BOLTS AND THE LIKE FOR USE IN BOLT AND LIKE GUNS
Filed June 20, 1956

Inventor:
Max Skumawitz

United States Patent Office 2,875,665
Patented Mar. 3, 1959

2,875,665

BOLTS AND THE LIKE FOR USE IN BOLT AND LIKE GUNS

Max Skumawitz, Lintorf, Bezirk, Dusseldorf, Germany, assignor to Tornado-Ramset G. m. b. H. & Co., Bezirk, Dusseldorf, Germany Application June 20, 1956, Serial No. 592,517

Claims priority, application Germany June 24, 1955

1 Claim. (Cl. 85—30)

It is known to provide bolts and the like which are shot by a gun into brickwork, concrete or the like with guide members for locating and guiding the bolt in a barrel of the gun. These guide members are usually in the form of small caps, plates or the like and are made of elastic material, for example of synthetic material. When the bolt strikes its target, the guide members are either destroyed or slide rearwardly off the shank of the bolt. The manipulation of such guide members which have to be attached to the bolt is somewhat troublesome and time consuming.

The object of the invention is to avoid the above mentioned disadvantage. This is achieved, in accordance with the invention, by providing a bolt comprising a cylindrical and a substantially pointed leading end portion with radially extending ribs the angular outer ends of which are disposed circumferentially from the outer ends of said ribs, the outer surface of said ribs forming guide surfaces, the ribs being pressed out of the material of the bolt itself, namely from the shank of the bolt. By this means not only are separate guide members unnecessary, but also the shooting of the bolt is greatly facilitated.

In the case of bolts which, as is usual, are produced by an upsetting process in a multi-part die, the ribs can be formed directly by the ridges which are thereby produced at the leading end portion of the bolt, these ridges not being removed as usual but being bent to form guide ribs extending radially from the leading end portion of the shank of the bolt. The ribs have angular outer ends disposed circumferentially from the outer ends of the ribs, the outer surface of said ribs forming smooth spaced guide and holding surfaces substantially the diameter of the head and corresponding to the diameter of the bore of the barrel of the bolt gun, so that the bent ends form guiding and locating surfaces.

Figure 1:
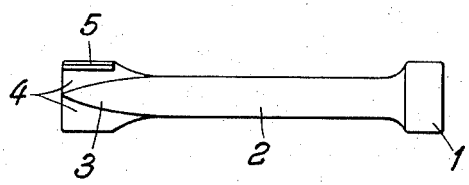
Figure 2:
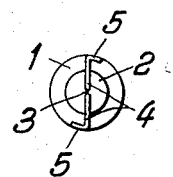

An example of a bolt in accordance with the invention is illustrated in the accompanying drawing, wherein:

Fig. 1 is a side elevation of the bolt; and
Fig. 2 is an end elevation of the bolt.

Referring to the drawing, the bolt consists of an enlarged head 1 at the trailing end and a cylindrical shank 2. The leading end or tip 3 of the bolt is provided with radial guide ribs 4. The angular outer ends 5 of the ribs 4 are disposed circumferentially from the outer ends of said ribs, the outer surface of said ribs forming smooth spaced guide and holding surfaces. When the bolts are made in a multi-part die by an upsetting process, the guide ribs 4 are made from the ridges produced by the upsetting process, their angular outer ends being disposed circumferentially from the outer ends of said ribs, the outer surface of said ribs forming smooth spaced guide and holding surfaces substantially the diameter of the head and being integral with the bolt shank and pressed from the material of which the leading end portion of the shank is made.

I claim:

A bolt for use in a bolt gun, comprising a cylindrical shank and a substantially pointed leading end portion, an enlarged head at the trailing end of said shank, guide ribs extending radially from the leading end portion of said shank, said ribs having angular outer ends disposed circumferentially from the outer ends of said ribs, the outer surface of said ribs forming smooth spaced guide and holding surfaces, having substantially the diameter of the head and being integral with the bolt shank and pressed from the material of which the leading end portion of the shank is made.

References Cited in the file of this patent

UNITED STATES PATENTS

| 1,656,333 | Lund | Jan. 17, 1928 |
| 2,676,508 | Erickson | Apr. 27, 1954 |
| 2,761,348 | Williams et al. | Sept. 4, 1956 |

FOREIGN PATENTS

| 184,524 | Austria | Jan. 25, 1956 |
| 184,525 | Austria | Jan. 25, 1956 |